W. C. ALLISON.
Pipe-Joints.

No. 214,804.    Patented April 29, 1879.

Witnesses:

Inventor.
Wm. C. Allison
by his Atty
George H Carding

UNITED STATES PATENT OFFICE

WILLIAM C. ALLISON, OF PHILADELPHIA, PENNSYLVANIA.

IMPROVEMENT IN PIPE-JOINTS.

Specification forming part of Letters Patent No. 214,804, dated April 29, 1879; application filed January 28, 1879.

*To all whom it may concern:*

Be it known that I, WILLIAM C. ALLISON, of the city and county of Philadelphia, and State of Pennsylvania, have invented a new and useful Joint for Metal Pipes, of which the following is a clear, full, and exact description, reference being had to the accompanying drawings, which form part of this specification, and in which are represented two forms of my improved joint.

My invention has for its object the construction of a joint for metal pipes, which is designed as an improvement on other forms of joints now in use; to which end it consists in so expanding and compressing the end of a piece of pipe, technically known in the art as "upsetting," as to adapt it to receive the end of another piece of pipe, to which it may be firmly connected by a suitable screw-thread.

I am aware that boiler tubes and pipes have heretofore been upset at their ends to increase the wearing-surface thereof; but pipes with upset and expanded ends for receiving screw-threads have not been used.

The object of upsetting the ends of the pipe is to secure increased strength in those parts which in other forms of joints are the weakest.

Figure 1:
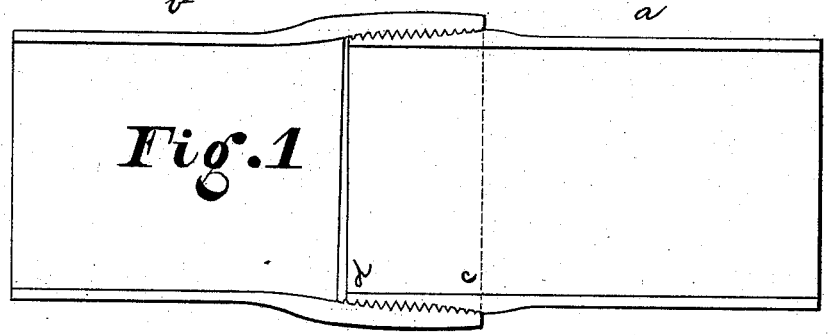
Figure 2:
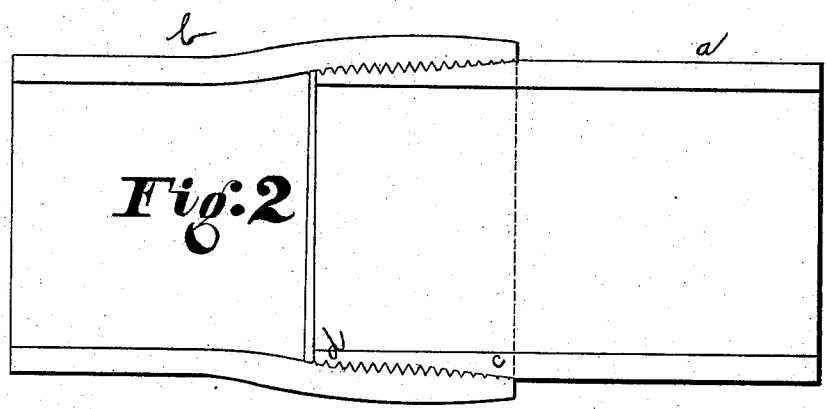
Figure 3:
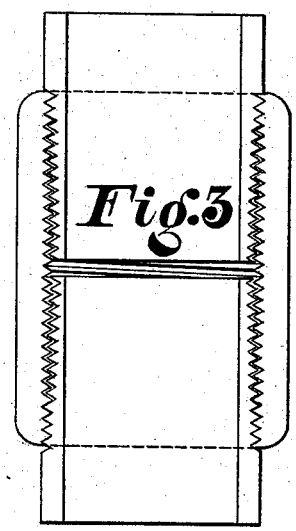

In the accompanying drawings, in which similar letters of reference indicate like parts, Figure 1 represents the first form of my improved joint; Fig. 2, the second form of my improved joint; and Figs. 3 and 4 represent the old forms of joints.

In Fig. 1 the pipe-joint, as shown, is made of light metal, and both male, *a*, and female, *b*, are upset, the female, *b*, being expanded and upset sufficiently to admit the screw-thread being cut, and leaving the outside equal to, or even thicker, if necessary, than, the other parts of the pipe.

Where the pipe is sufficiently strong to admit of a thread, as shown on the male, *a*, in Fig. 2, it is only necessary to expand and upset the female, *b*, to make it equal, or stronger than, any other part of the pipe. The usual way of coupling pipe of that thickness is shown in Fig. 3, by means of a socket.

Figure 4:
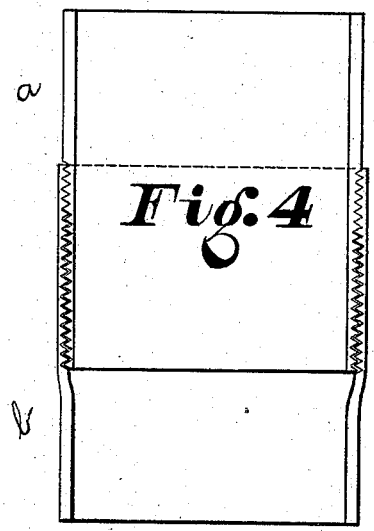

In Fig. 4 is shown the usual way of making a joint. The female pipe *b* is expanded and not upset, and by so doing reduces the thickness of metal, so that after cutting the screw-thread leaves the joint much weaker than the other parts of the pipe.

The pipes, as shown in Figs. 1 and 2, are connected by a taper or vanishing screw-thread at the upper end, *c*, for which I was granted Letters Patent of the United States, July 12, 1870.

In connection with the upsetting of the pipe, I make a taper or vanishing thread on the end of the male pipe *a*, and counterpart of the female pipe *b* at *d*, as shown in Figs. 1 and 2, increasing the strength of the pipe at that point.

Having thus described my invention, what I claim, and desire to secure by Letters Patent of the United States, is—

1. A metal pipe having one of the ends upset and expanded, and the other end upset, adapting it to be joined to another pipe by a screw-thread, substantially as described.

2. The combination of a male and female pipe, the former being upset, and the latter upset and expanded, and provided with vanishing screw-threads, substantially as and for the purpose set forth.

3. A metal pipe having one end upset and expanded, and the other end not upset, both of said ends being adapted to be joined to another pipe by screw-threads, substantially as described.

4. In a pipe-joint, the combination of a male and female pipe provided with screw-threads, the latter being upset and expanded, and the former not upset, substantially as and for the purpose described.

In testimony that I claim the foregoing as my own I affix my signature in the presence of two witnesses.

W. C. ALLISON.

Witnesses:
JOHN R. BENNETT,
R. S. CHILD, Jr.